United States Patent [19]
Koyama et al.

[11] 3,930,141
[45] Dec. 30, 1975

[54] AUTOMATIC TIRE CLASSIFYING APPARATUS

[75] Inventors: Masao Koyama, Hatano; Hiromitsu Akashi; Yoichi Nishikawa, both of Hiratsuka; Susumu Fujiwara, Fujisawa; Takao Okada, Yokohama, all of Japan

[73] Assignee: The Yokohama Rubber Company, Ltd., Japan

[22] Filed: Oct. 4, 1974

[21] Appl. No.: 512,163

[30] Foreign Application Priority Data
Oct. 9, 1973  Japan.............. 48-112848

[52] U.S. Cl................... 235/61.11 E; 152/330
[51] Int. Cl.².................. G06K 7/10; B60C 13/00
[58] Field of Search...... 235/61.11 E; 250/555, 566; 340/146.3 F, 146.3 Z; 152/330, 361, 362

[56] References Cited
UNITED STATES PATENTS

| | | |
|---|---|---|
| 2,985,216 | 5/1961 | Williams et al. ............... 152/330 R |
| 3,225,810 | 12/1965 | Enabnit............................... 152/330 |
| 3,233,647 | 2/1966 | Newell ............................ 152/330 R |
| 3,781,798 | 12/1973 | Hinks........................... 340/146.3 R |
| 3,786,850 | 1/1974 | Turoczi, Jr...................... 152/330 R |

*Primary Examiner*—Daryl W. Cook
*Attorney, Agent, or Firm*—Robert E. Burns; Emmanuel J. Lobato; Bruce L. Adams

[57] ABSTRACT

An automatic tire classifying apparatus comprising a camera tube for detecting a classification mark of a tire, a tire positioning mechanism for setting the relative position between the tire and camera, a rotary mechanism for relatively turning the tire and the axis of a light beam incident to the camera so that the classification mark is within the angle of view of the camera tube during the rotation, and an electrical circuit for reading output signals of the camera tube representing the classification mark to determine the kind of the tire.

4 Claims, 15 Drawing Figures

AUTOMATIC TIRE CLASSIFYING APPARATUS

BACKGROUND OF THE INVENTION

This invention relates to automatic tire classifying apparatuses and more particularly to apparatuses which operate to automatically classify and accordingly select the kinds of wheel tires by optically reading classification marks stamped on the wheel tires.

In general, a wheel tire manufacturing factory manufactures various kinds of wheel tires, which are stored in one and the same warehouse. In this connection, it is very important to know how many tires are stored in the warehouse with respect to each of the kinds of tires. For this purpose, it is necessary to classify tires which are successibly delivered to the warehouse. Heretofore, this classification has been conducted by workers who visually read the classification marks on the tires. However, this classification method is disadvantageous because there are several items which must be read for the classification of tires. That is, it is necessary to discriminate the inside diameters, thicknesses, materials of reinforcement layers (such as nylon, polyester, rayon, steel, etc.) and tread patterns of the tires. Furthermore, it must be discriminated whether or not the tire is a tubeless tire and whether or not it is a white walled tire.

These items are stamped on the surface of each tire by the use of a classification mark comprising characters, numerals, and symbols.

In the tire manufacturing factory, frequently similar kinds of tires are successively conveyed in a continuous stream to the tire classifying workers, who are therefore liable to become fatigued and make errors in the classification of the tires. Furthermore, it is difficult to secure such tire classifying workers because only well experienced tire classification workers can do the work.

SUMMARY OF THE INVENTION

Accordingly, it is an object of this invention to provide an automatic tire classifying apparatus which will relieve tire classifying workers.

More specifically, an object of the invention is to provide an automatic tire classifying apparatus which operates to automatically and accurately classify kinds of tires by automatically reading classification marks which have been stamped on the tires during the vulcanization thereof.

Briefly stated, the automatic tire classifying apparatus according to this invention comprises an illumination light source for illuminating a classification mark which is provided on the surface of each tire for representing the kind thereof, a camera tube for forming an image of the classification mark thus illuminated, a rotary mechanism which operates to relatively rotate the tire and the axis of incident light of the camera tube thereby to enable the camera tube to pick up within the angle of view thereof the classification mark during the rotation, a position adjustment mechanism for adjusting the relative positions of the camera tube, light source, and tire, a mark reading section for analyzing electrical signals produced by the camera tube to read the classification mark, and an identification section for identifying the electrical signals to determine or classify the kind of the tire.

Various further and more specific objects, features and advantages of the invention will become more apparent from the following detailed description and appended claims when read in conjunction with accompanying drawings in while like parts are designated by like reference characters and numerals.

BRIEF DESCRIPTION OF THE DRAWINGS

In the accompanying drawings:

FIG. 4($a$) and 4($b$) are plan views illustrating a classification mark stamped on the surface of a wheel tire.

FIGS. 5($a$) and 5($b$) are diagrammatic views indicating the positional relationships between as illuminating light source, a camera tube, and a classification mark;

FIGS. 7($a$), 7($b$) and 7($c$) are graphical representations indicating electrical signals produced by the camera tube;

DETAILED DESCRIPTION OF THE INVENTION

Figure 1:
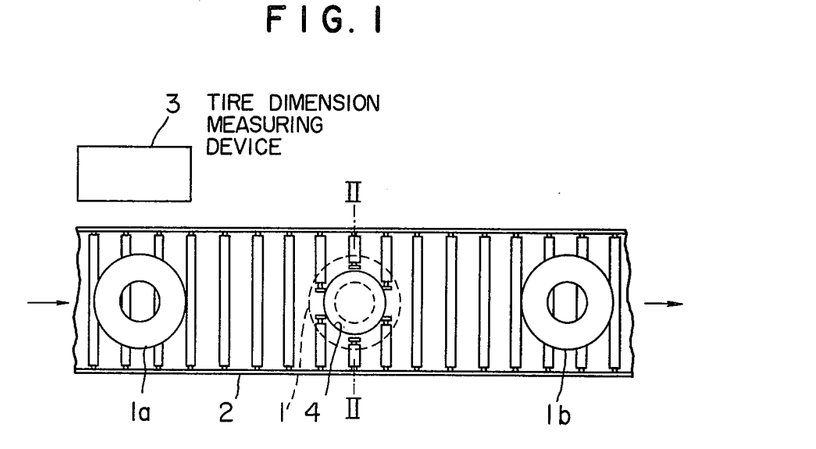
FIG. 1 is a fragmentary plan view illustrating one example of a roller conveyer which conveys tires one by one to an automatic tire classifying apparatus according to this invention.
Figure 2:
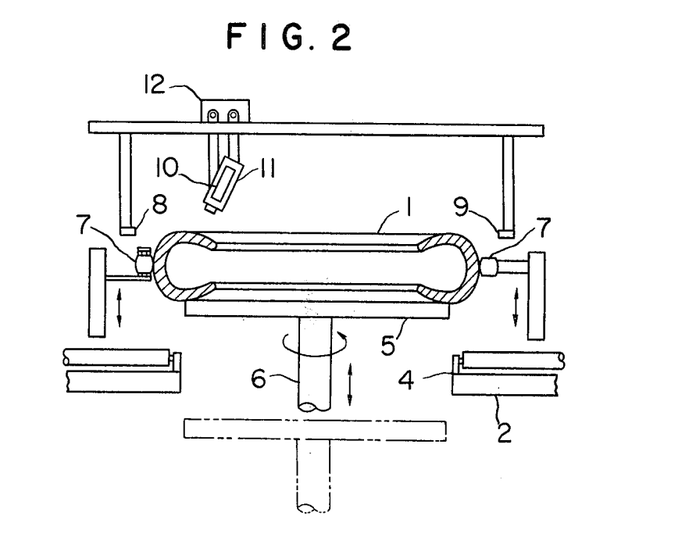
FIG. 2 is an elevation, partly in section, diagrammatically illustrating one example of the automatic tire classifying apparatus according to the invention.

Shown in FIG. 1 is a roller conveyer for conveying wheel tires one by one to an automatic tire classifying apparatus according to this invention. FIG. 2 is a sectional view, a part of which is taken along line II—II of FIG. 1, and which illustrates one example of the automatic tire classifying apparatus. As is apparent from FIG. 1, the tire is conveyed by the conveyer 2 from left to right, or in the direction of the arrow. The tire 1$a$ is at a tire dimension measuring position where the dimensions of a tire, such as, for instance, the inside diameter and thickness of the tire are measured by a tire dimension measuring device 3 which is well known in the art. The tire whose dimensional data have been measured is conveyed to a classification mark reading position. In FIG. 1, the tire 1 is at this classification mark reading position, where the conveyer 2 is provided with a circular hole whose diameter is smaller than the outside diameter of the tire 1 and greater than the inside diameter of the same as is apparent from FIG. 1.

The classification mark reading apparatus, as is shown in FIG. 2, is provided with a turntable 5 whose diameter is slightly smaller than that of the circular hole 4. The turntable 5 is rotated by a vertical shaft 6 while being moved upward or downward. The turntable 5 has an upper position where it is set after having been moved upward and a lower position where it is set after having been moved downward. The turntable is at the upper position in FIG. 2. The lower position is below the roller conveyer 2 as is shown by the broken line in FIG. 2.

The apparatus according to the invention further comprises tire positioning arms 7 which operate to position the tire so that the center of the tire is directly above the center of the turntable and a device for controlling the tire's vertical position (hereinafter referred to as a vertical position controlling device) which is provided with a light source 8 for emitting a thin light beam and a photo-electric tube 9 for receiving the thin light beam.

When the tire on the turntable is moved upward until finally the upper surface of the tire intercepts the light beam emitted from the light source 8, the vertical movement of the turntable 5 is stopped. Therefore the distances between the surface of the tire and a classification-mark reading light source 10 and a camera tube 11 can be maintained constant, that is, the distances therebetween are of constant values whenever a tire is at the upper position.

The apparatus further comprises a device 12 for controlling the horizontal positions of the light source 10 and the camera tube 11 (hereinafter referred to as a horizontal position controlling device 12) so that the classification mark engraved on the surface of the tire is at a specific detection position when it is detected by the camera tube 11. The device 12 is controlled in response to the inside diameter of the tire which has been measured by the tire dimension measuring device 3. The camera tube 11 comprises a semiconductor type image sensor in which no after-image occurs. Ordinary television cameras are not suitable for detecting the mark on the tire because after-image phenomena occur therein.

The operation of the automatic tire classifying apparatus shown in FIGS. 1 and 2 will now be described with reference also to FIGS. 3, 4, 5 and 6.

Figure 3:
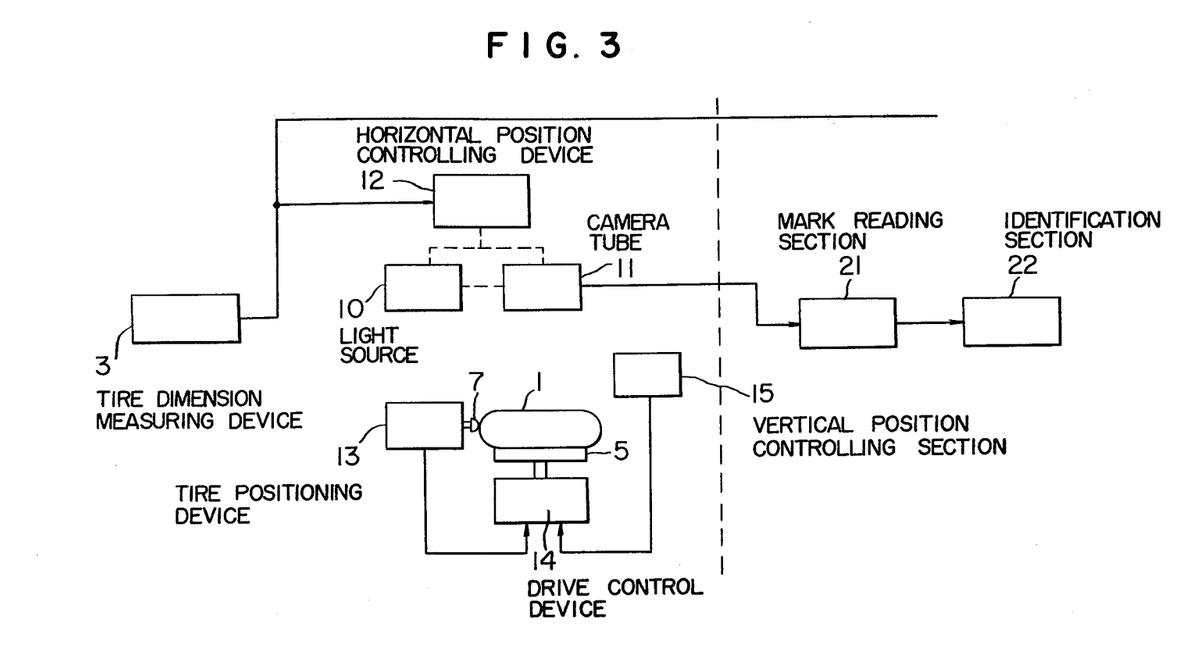
FIG. 3 is a block diagram for a description of the operation of the automatic tire classifying apparatus shown in FIG. 2.

Each tire laid on the roller conveyer 2 is conveyed to the tire dimension measuring position, where the dimensions of the tire, namely, the inside diameter, thickness, etc., of the tire are measured by the tire dimension measuring device 3. Then, the tire is further conveyed to the classification mark reading position. At this position, the tire is positioned in place by the arms 7. When the tire has been positioned, a tire positioning device related to the arms 7 transmits a signal to a drive control device 14 of the turntable 5 to move the table upward. In this operation, it is assumed that the turntable 5 is rotated at a rate of, for instance, 30 r.p.m., at all times. When the turntable 5 moving upward finally contacts the tire 1 laid on the roller conveyer 2, the tire is supported on the turntable 5 and is therefore rotated by the turntable 5.

The turntable 5 is further moved upward. However, when the upper surface of the tire 1 on the turntable 5 reaches a position (a height) where the upper surface of the tire 1 intercepts the light beam emitted from the light source 8, a vertical position controlling device 15 produces a signal which is introduced to the drive control device 14 to stop the upward movement of the turntable 5.

Next, or during the operation described above, information on the inside diameter of the tire is introduced to the horizontal position controlling device 12 from the tire dimension measuring device 3 whereby the light source 10 and the camera tube are moved to proper positions according to the inside diameter of the tire. As is indicated by the broken line in FIG. 3, the light source 10 and the camera tube 11 are connected together, forming one unit which is controlled by the horizontal position controlling device 12.

Figure 4A:
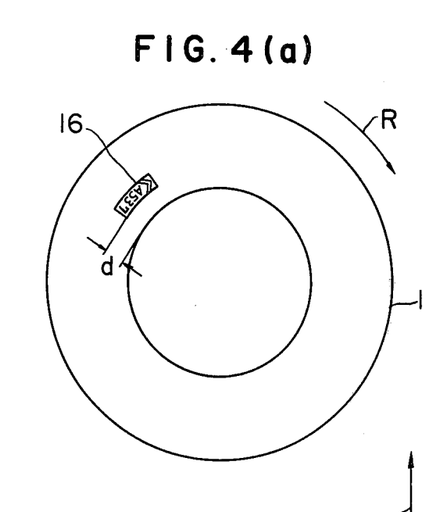
Figure 4B:
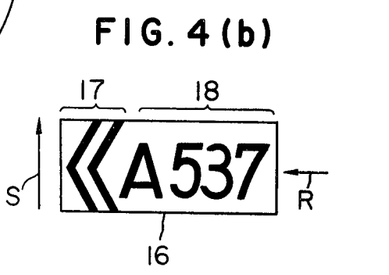

FIG. 4(a) shows a classification mark 16 which is stamped on the surface of a tire. The mark 16 is provided at a predetermined distance $d$ from the inner edge of the tire. FIG. 4(b) is an enlarged view of the mark 16, which consists of a symbol mark 17 and a classification information mark 18. The symbol mark 17 is a kind of pattern different from the classification information mark 18 which consists of an alphabetical letter and a plurality of numerals.

The classification mark 16 is stamped on the surface of a tire in the process of vulcanization thereof. More specifically, an embossed classification mark is provided directly on the inner surface of a mold used for the vulcanization of the tire, or a stencil plate is provided on the inner surface. A molded green tire is inserted in the mold thus treated and is then vulcanized, as a result of which the classification mark is provided on the surface of the tire.

In general, the surface of a wheel tire is black and is optically rough. Accordingly, it is considerably difficult to optically read a classification mark stamped on the surface of the tire. In this invention, as is shown in FIG. 5, an optically special treatment is applied to the surface of the tire, that is, the contrast of the classification mark 16 is increased so that no error is caused in the mark reading operation.

Figure 5A:
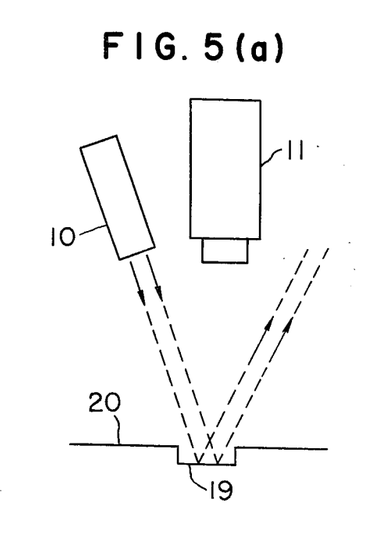
Figure 5B:
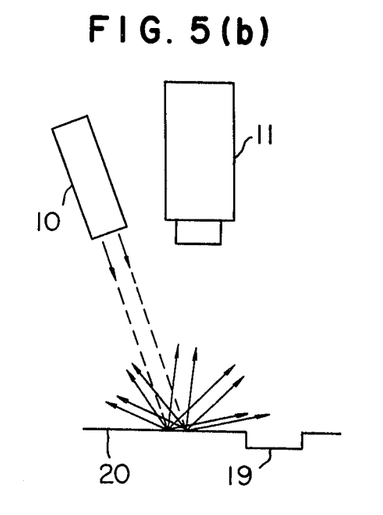

More specifically, in stamping the classification mark 16 on the surface of the tire, the surface of the mark 16 which is a recessed part 19 of the tire is made smooth, or optically lustrous, in order to increase the reflection factor of the part 19 as is shown in FIG. 5(a), while the remaining part 20 other than the part 19 is made optically rough so that irregular reflection is caused as is shown in FIG. 5(b). For this purpose, the surfaces of the embossed parts and the remaining part of the mark, or the stencil plate, provided on the inner surface of the mold are made smooth and rough, respectively.

As is shown in FIG. 5(a), the light source 10 emits parallel light beams to the surface of the tire. The camera tube 11 is positioned outside a regular reflection beam path which is formed when the parallel beams are regularly reflected by the smooth surface 19 of the tire. More specifically, when the parallel beams reflected by the smooth surface 19 of the tire are not scattered, that is, the beams are reflected along the regular reflection beam path, the quantity of light beams entering the camera tube is relatively small.

As is shown in FIG. 5(b), on the other hand, when the parallel beams impinge on the rough surface 20 of the tire, they are scattered or irregularly reflected, and accordingly the quantity of light beams caught by the camera tube 11 is relatively large.

Figure 6:
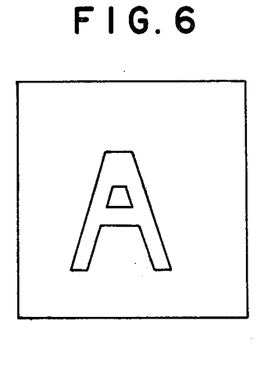
FIG. 6 is a diagram showing an image formed with the aid of electrical signals produced by the camera tube.

As a result, electrical signals produced by the camera tube 11 form an image which indicates a black letter on a bright background as is illustrated in FIG. 6.

In the case when the classification mark 11 is detected by the camera tube 11 comprising a semiconductor type image sensor, sub-scanning is carried out by turning the tire in the direction of the arrow R in FIG. 4(a), while main-scanning is carried out in the direction of the arrow S perpendicular to the direction of the arrow R in FIG. 4(b). The main-scanning is achieved by electrically scanning semiconductor image sensors in array. The classification mark 16 is read by the camera tube 11 during a period in which the tire 1 is turned through more than 360° (one turn of the tire), for instance, 400°.

The electrical signals from the camera tube 11 are introduced to a mark reading section 21 where the electrical signals are analyzed, that is, signals representing the symbol mark 17 are detected and then the classification information mark 18 is read. The electrical signals read by the section 21 are further supplied to an identification section 22, where the signals are identified to determine the kind of the tire.

In order to analyze the electrical signals of the camera tube 11 and to read the classification mark 16, the present invention provides the following special means.

As is shown in FIG. 4(b), the symbol mark 17 is at the top part of the classification mark 16. The information on this symbol mark 17 is stored in the mark reading section 21 in advance. When the symbol mark 17 has been detected by the camera tube 11 and then identified by the mark reading section 21, the mark reading section 21 starts reading the classification information mark 18. The provision of the symbol mark 17 at the top part of the classification mark 16 allows the apparatus to exactly read the classification information mark 18. Accordingly, it is possible to clearly distinguish the classification mark 16 from other characters and numerals provided on the tire.

Furthermore, in this invention the mark reading section 21 has a specially designed electrical circuit to improve the accuracy in reading the classification mark, which will be described below.

The analysis of the signals carried out by the mark reading section 21 is to discriminate whether the signal delivered from the camera tube 11 is a signal representing the surface of the mark 16, namely, the recessed part 19 (or representing a black level) or a signal representing the part 20 other than the recessed part 19 (or representing a white level). However, this discrimination cannot be readily achieved because of the following reason. The electrical signal delivered from the camera tube 11 include various distortion signals as well as necessary information signals these distortion signals are caused by the distortion characteristic of the camera tube itself, the ununiformity in intensity distribution of the light beams emitted from the irradiation light source 10, and the optical ununiformity of the surface of the tire and surface of the mark.

In the case where the ratio of the necessary information signal to the distortion signal, namely, the signal-to-noise ratio S/N is great, there is no problem in detecting the classification mark. However, with respect to the electrical signal produced by the camera tube which detects the classification mark 16 stamped on the surface of the tire, the signal-to-noise ratio S/N is often small even when the special optical treatment is applied to the surfaces of the parts 19 and 20. Therefore, the effect of the distortion signal on the detection of the classification mark cannot be disregarded in some cases.

Figure 7A:
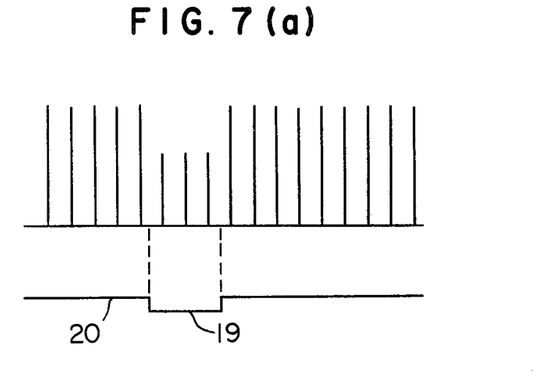

FIG. 7(a) is a graphical representation indicating electrical signals produced by the camera tube when the surfaces of the parts 19 and 20 are optically ideal, that is, the signals include no distortion signal. As is apparent from FIG. 7(a), since the quantity of beams entering the camera tube 11 is relatively small when the camera tube scans the part 19, the levels of the electric signals are lower than those of electrical signals produced when the camera tube scans the part 20.

Figure 7B:
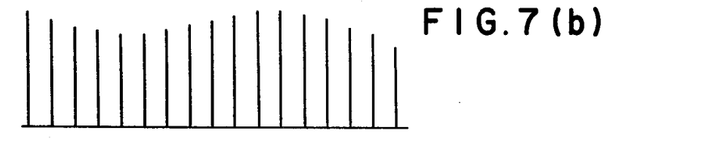

FIG. 7(b) is also a graphical representation indicating the electrical signals produced by the camera tube when it scans only the surface of the tire which has no marks. In this case, only a distortion signal is indicated.

Figure 7C:
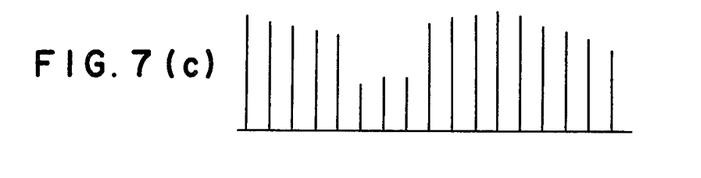

Electrical signals actually produced by the camera tube are as shown in FIG. (c), indicating associated electrical signals of those indicated in FIGS. 7(a) and 7(b).

In general, the frequency of the distortion signal is lower than that of the information signal, that is, the distortion signal varies slowly. However, the magnitude of the whole variation of the distortion signal cannot be disregarded.

Figure 8:
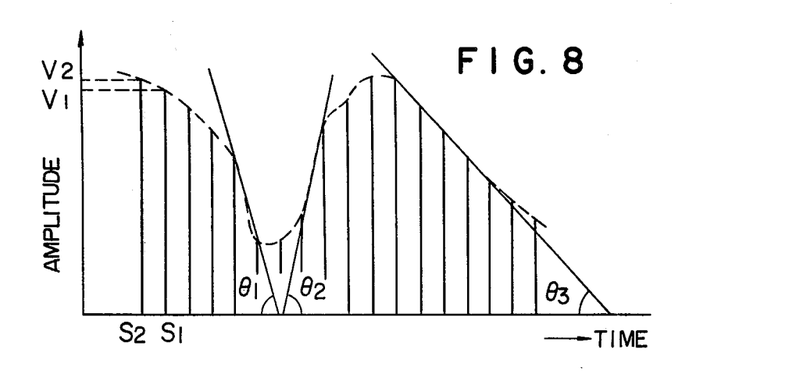
FIG. 8 is also a graphical diagram for a description of the signal level discriminating operation of a mark reading section in the apparatus shown in FIG. 2.

FIG. 8 is also a graphical representation indicating combined signals of the necessary information signals and the distortion signals. As is clear from FIG. 8, when the information signal is changed from the white level to the black level, the change in amplitude of the information signal is relatively great, but the change in amplitude of the distortion signal is relatively small because the change in amplitude of the distortion signal is slow and gentle.

In other words, as is apparent from FIG. 8, variation of the information signal is greater than that of the distortion signal, that is, $\theta_1$ (or $\theta_2$) $> \theta_3$. On the basis of this fact, the difference between succeeding digital signals $S_1$ and $S_2$ is compared with a certain value to discriminate the levels of the signal which will become apparent later.

If it is assumed that the signal $S_1$ has an amplitude $V_1$ while the signal $S_2$ has an amplitude $V_2$, the absolute value of the difference between these two amplitudes can then be represented by $|V_1 - V_2|$. This absolute value is compared with a predetermined value $\Delta V_o$. In this case, if $|V_1 - V_2| < \Delta V_o$, it is determined that the level of the signal $S_2$ is the same as that of the signal $S_1$; that is, if the signal $S_1$ is at a white level, the signal $S_2$ is also at the white level. On the other hand, if $|V_1 - V_2| > \Delta V_o$, it is determined that the level of the signal $S_2$ is different from that of the signal $S_1$; that is, if the signal $S_1$ is at the black level, the signal $S_2$ is at the white level.

When the signals are analyzed in this manner, the levels of the information signals can be discriminated without errors, even if a distortion signal which is so great as to change the base level line exists together with the information signals.

Figure 9:
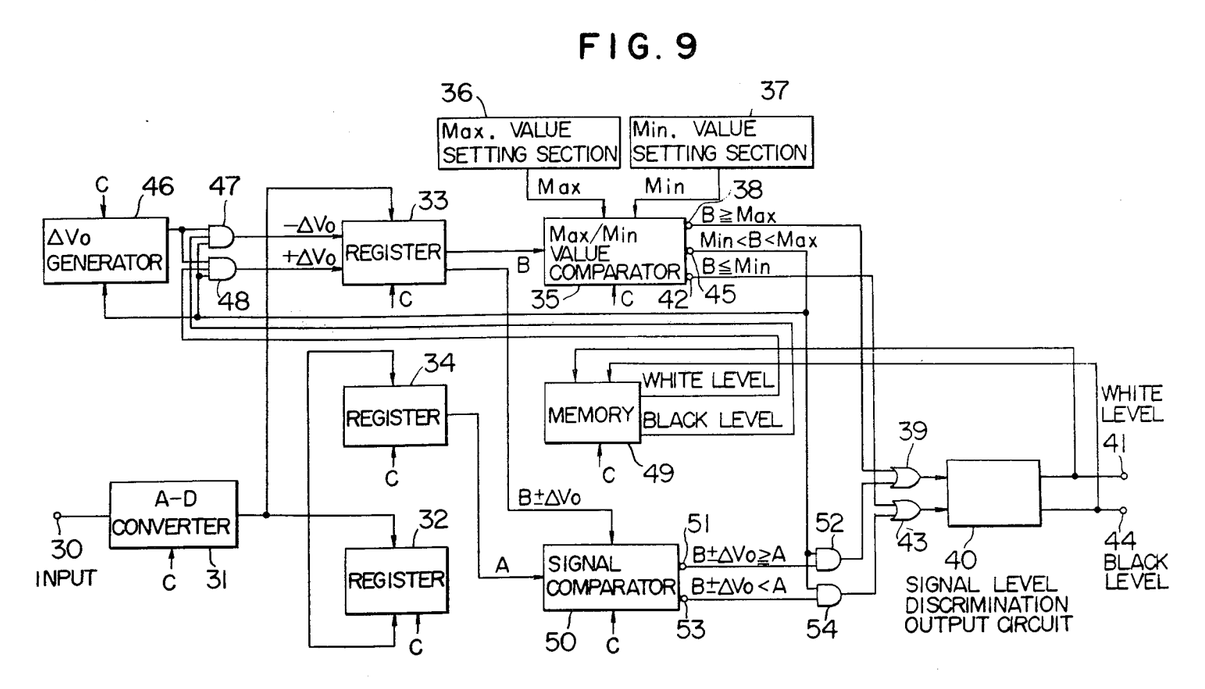
FIG. 9 is a block diagram showing one example of a signal level discriminating circuit in the mark reading section.

FIG. 9 is a block diagram showing one example of the mark reading section 21 which carries out the discrimination of signal levels in the manner described above.

An input signal including a distortion signal as shown in FIG. 8 is applied from the camera tube 11 to an input terminal 30 of an analog-to-digital converter 31, where the input signal is converted into a digital signal. The digital signal thus obtained is introduced to a first register 32 and a second register 33.

The digital signal stored in the first register 32 is transferred to a third register 34 at the time instant when the next digital signal is applied to the first register 32. More specifically, at this time instant, the next digital signal mentioned above is stored, as a new digital signal, in the first and second registers 32 and 33, while the preceding signal, or the digital signal firstly stored in the first register, is transferred to the third register 34.

For convenience in description, the new digital signal stored in the registers 32 and 33 is designated by $S_2$, while the preceding signal is designated by $S_1$, the signals $S_2$ and $S_1$ having amplitudes B and A, respectively. Furthermore, it is assumed that the level of the signal $S_1$ has been discriminated, and the level of the signal $S_2$ is to be discriminated.

First, the amplitude B of the signal $S_2$ stored in the second register 33 is applied to a comparator 35 so that the value of the amplitude B is compared with maximum and minimum values Max and Min which are set respectively in a maximum value setting section 36 and a minimum value setting section 37 (the comparator 15 being hereinafter referred to as a max/min value comparator 35, when applicable).

When the value of the amplitude B of the signal $S_2$ is equal to or greater than the maximum value Max, the comparator 35 produces an output signal at its first output terminal 38. This output signal is introduced through an OR gate 39 to a signal level discrimination output circuit 40. In this case, the circuit 40 produces a white level signal at its first terminal 21.

When the value of the amplitude B of the signal $S_2$ stored in the second register 33 is equal to or less than the minimum value Min mentioned above, the comparator 35 produces an output signal at its third output terminal 42. This output signal is introduced through an OR gate 43 to the signal level discrimination output circuit 40. In this case, the circuit 40 produces a black level signal at its second terminal 24.

When the value of the amplitude B of the signal $S_2$ is less than the maximum value Max and greater than the minimum value Min, the max/min value comparator 35 produces an output signal at its third output terminal 45. This output signal is applied to a generator 46 which is adapted to generate a predetermined value $\Delta V_o$ (hereinafter referred to as "$\Delta V_o$ generator 46", when applicable) and also to AND gates 47 and 48 which are connected to the output of the $\Delta V_o$ generator 46. The signal $\Delta V_o$ from the $\Delta V_o$ generator 46 which stores information on the level of the digital signal A representing the amplitude of the preceding signal $S_1$, which level has been already discriminated, is applied to the AND gates 47 and 48.

More specifically, when the signal A is at the black level, the signal from the memory 49 is applied to the AND gate 47; and when it is at the white level, the signal from the memory 49 is applied to the AND gate 48.

If it is assumed that the preceding signal $S_1$ is at the black level, the signal $\Delta V_o$ which is negative is applied through the AND gate 47 to the second register 33. Accordingly, the signal B stored in the second register 33 is substracted by the signal $\Delta V_o$, that is, a signal representing a value B—$\Delta V_o$ is applied to a signal comparator 50 to which a digital signal representing the amplitude A of the preceding signal $S_1$ is applied from the third register 34. If B—$\Delta V_o \geq$ A, the signal comparator 30 produces an output signal at its first output terminal 31. This output signal is applied to one of the input terminals of an AND gate 52, while the signal from the max/min value comparator 35 is applied through its third terminal 45 to the other input terminal of the AND gate 52. Accordingly, the AND gate 52 is rendered conductive. Therefore, the output signal from the signal comparator 50 is introduced through the AND gate 52 and the OR gate 39 to the signal level discrimination output circuit 40. Thus, the circuit 40 provides the white level signal at its first output terminal 21.

The inequality B— $\Delta V_o \geq$ A described above is equal to an inequality B—A $\geq \Delta V_o$. Therefore, it is discriminated that the level of the signal $S_2$ is different from that of the signal $S_1$, that is, it is the white level.

In the case of B—$\Delta V_o \geq$ A, on the other hand, the signal comparator 50 produces an output signal at its second terminal 53. This output signal is introduced through the AND gate 54 and the OR gate 43 to the signal level discrimination output circuit 40. In this case, the circuit 40 provides the black level signal at its second output terminal 44. The inequality B— $\Delta V_o <$ A to equal to an inequality B—A $<\Delta V_o$. Accordingly, it is discriminated that the level of the signal $S_2$ is the same as that of the signal $S_1$, that is, it is the black level.

The level signal thus provided at the output terminal 41 or 44 is applied to the memory 49, which now stores information on the discriminated level of the signal $S_2$ in place of that of the signal $S_1$.

The operation of the mark reading circuit 21 has been described in connection with the case where the level of the preceding signal $S_1$ is the black level. However, it should be noted that in the case also where the level of the preceding signal $S_1$ is the white level, substantially the same operation is carried out to discriminate the level of the signal $S_2$.

In this case, the AND gate 48 is rendered conductive, and the signal $\Delta V_o$ which is applied to the second register 33 is positive. Accordingly, a value B+ $\Delta V_o$ is compared with the value A in the signal comparator 50. If B+$\Delta U_o \geq$A, the level of the signal $S_2$ is the same as that of the signal $S_1$, that is, it is the white level. If B+$\Delta V_o <$A, the level of the signal $S_2$ is the black level which is different from the level of the signal $S_1$.

As is indicated in FIG. 9, a control signal $c$ is applied to the analog-to-digital converter 31, the first, second and third registers 32, 33 and 34, the comparators 35 and 50, and the memory 49 so as to operate these elements with suitable timing.

Figure 10:
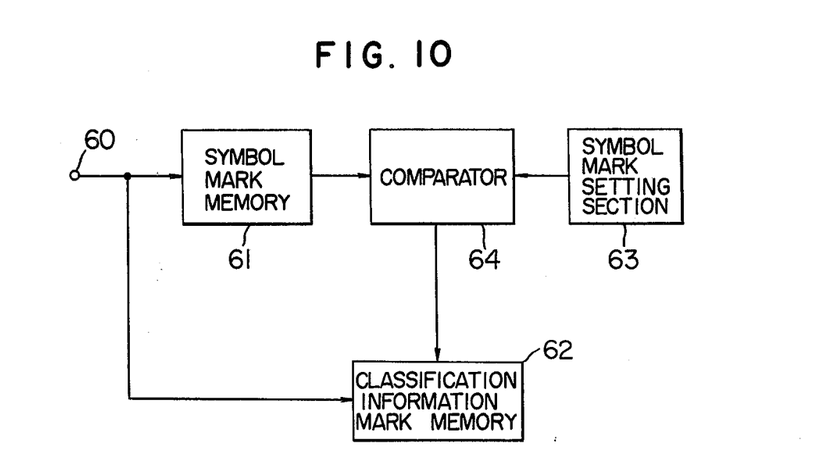
FIG. 10 is also a block diagram showing a classification mark reading circuit in the mark reading section.

The mark reading section 21 further comprises a circuit, which is indicated in FIG. 10. An output signal of the signal level discrimination output circuit 40 (FIG. 9) is applied to an input terminal 60 of the circuit. This output signal is supplied to a symbol mark memory 61 and a classification information mark memory 62. The circuit shown in FIG. 10 further comprises a symbol mark setting section 63 which stores in advance information on a predetermined symbol mark 17 (FIG. 4b), and a comparator 64. The output signals from the discrimination output circuit 40 are sequentially applied, as input signals, to the memories 61 and 62. This input signal is compared with a symbol mark signal produced by the symbol mark setting section 63 in the comparator 64. When these signals coincide with each other, the comparator 64 produces a coincidence signal which is introduced to the classification information mark memory 62. Until the coincidence signal has been produced, the memory 62 does not start storing the input signal applied through the terminal 60. In other words, the memory 62 starts storing the input signal upon production of the coincidence signal. Thus, the signal representing the classification information mark 18 of the classification mark 16 (FIG. 4b) is positively stored in the memory 62.

The classification information mark signal thus stored is introduced to the identification section 22 (FIG. 3). This section 22 is provided with a memory which has stored signals representing the classification information marks 18 of the classification marks 16 stamped on tires, and determines the classification of the tire by determining which classification information mark among these stored in the memory is corresponding to the classification information mark signal introduced by the mark reading section 21 by computing the simularity therebetween in a matrix matching method.

The resultant data thus determined are sent to an electronic computer, a printer, and a display unit such as a monitor television set. After the classification of the tire has been achieved in the manner described above, the identification section 22 produces an output signal which is delivered to the drive control section 14 of the turntable 5 to move the turntable 5 downward.

Figure 11:
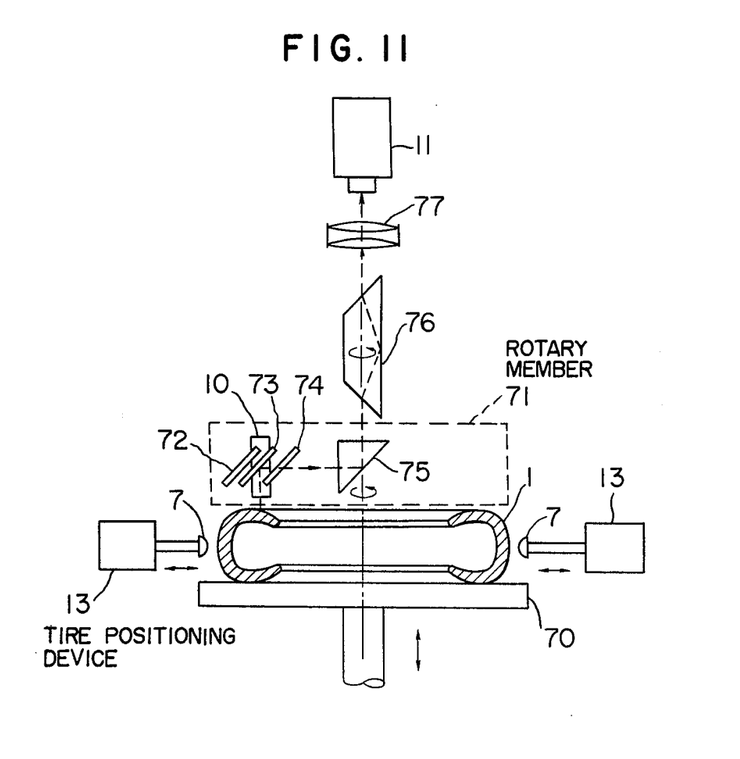
FIG. 11 is an elevation diagrammatically illustrating another example of the automatic tire classifying apparatus according to the invention.

A second example of the automatic tire classifying apparatus according to this invention is shown in FIG. 11.

In the first example of this invention, the illuminating light source 10 and the camera tube 11 are fixedly positioned, while the tire 1 on the turntable 5 is rotated. In contrast, in the second example, the tire is fixedly positioned while the irradiation light source and the axis of a beam entering the camera tube is turned around the central axis of the tire.

As is shown in FIG. 11, the tire 1 is laid on the table 70 which is not turned, but is moved upward and downward. The tire 1 is positioned in place by the tire positioning device 13. The apparatus further comprises a rotary member 71 which rotates around the central axis of the tire 1. The rotary member 71 incorporates the light source 10 and a plurality of reflective mirrors (three mirrors 72, 73 and 74 in this example). Any one of the three mirrors can be selectively inserted in the path of a light beam emitted from the light source 10 by means of, for instance, a solenoid as shown in FIG. 11. This is essential because different classification marks are stamped at different positions on the tires according to the dimensions of the tires.

The rotary member 71 further comprises a right-angled prism 71 disposed at the center of rotation of the rotary member. Therefore, a light beam emitted from the light source 10 is reflected by the surface of the tire, the reflective mirror 73, and the right-angled prism 75, and is finally transmitted in the direction of the axis of rotation of the rotary member.

Above the right-angled prism there is provided a trapezoid prism 76 which is rotated about the axis of rotation of the rotary member at an angular velocity which is half the angular velocity of the rotary member. The beam reflected by the right-angled prism 75 enters the trapezoid prism 76 and is reflected therein. The beam thus reflected enters the camera tube 11 through a lens 77.

Since the prism 76 is rotated at the rotation velocity which is half the rotation velocity of the rotary member 71, the image of the classification mark 16 is exactly formed on the camera tube 11 at all times.

In this example, although the table 70 is moved upward to set the surface of the tire at a suitable position, it is unnecessary to precisely adjust the distance between the camera tube 11 and the surface of the tire because the focal depth of the camera tube 11 is considerably great. Accordingly, it is possible to eliminate the table 70, that is, it is possible to read the classification mark of the tire which is placed on the conveyer instead of the table 70. In addition, the vertical position controlling device is also unnecessary for the reading of the classification mark.

While a few embodiments of the present invention have been illustrated and described in detail, it is particularly understood that the invention is not limited thereto or thereby and the invention can be readily modified by a person skilled in the art as follows.

For instance, (1) although the tire dimension measuring operation is carried out before the tire reaches the classification mark reading position in the above-described examples, it is possible to carry out the tire dimension measuring operation at the classification mark reading position. In this case, however, it is necessary to complete the tire dimension measuring operation before the horizontal position control is carried out.

2. Furthermore, the surface 19 of the mark is lustrous while the other surface 20 is rough in FIG. 5, but it is possible to make the former 19 rough and the latter 20 lustrous. In this case, a light character appears on a dark background unlike the case of FIG. 6.

3. It is possible to position the camera tube 11 in the path of the beam regularly reflected by the surface 19, so that the camera tube 11 receive a relatively large quantity of reflected beams from the lustrous surface 19 and a relatively small quantity of reflected beams from the rough surface 20.

4. The symbol mark 17 is provided at the top part of the mark 16 shown in FIG. 4(b), however, the symbol mark 17 may be omitted.

5. The symbol mark 17 shown in FIG. 4(b) is a specific pattern consisting of lustrous and rough stripes which are alternatively disposed in a radial direction of the tire, however, this pattern may be replaced by a character.

6. In the example shown in FIG. 2, the vertical position control is carried out by the light source 8 and the photoelectric tube, but it may be achieved by other means such as for instance a mechanical switch.

7. The upward movement of the turntable 5 may be controlled by introducing the information on the thickness of the tire, which is measured by the tire dimension measuring device 3, to the drive control device 14 of the turntable.

8. Moreover, three reflective mirrors 72, 73 and 74 are employed in the example shown in FIG. 11; however, the number of the mirrors is not limited thereto. For instance, the horizontal position control can be accomplished by only one reflective mirror, if it is adapted to be movable in the horizontal direction.

11. Furthermore, the camera tube 11 may be built in the rotary member 71. In this case, the trapezoid prism 77 can be omitted.

What we claim is:

1. An automatic tire classifying apparatus which comprises:
   a. an illumination light source for illuminating a classification mark which is provided on a part of the surface of each tire for representing the kind of the tire;
   b. a camera tube for detecting the classification mark thus illuminated by the light source thereby to produce electrical signals accordingly;
   c. a rotary mechanism operating to relatively rotate the tire and the axis of a light beam incident to the camera tube so that the camera tube can detect the classification mark within the angle of view;
   d. a position adjusting mechanism for adjusting the relative positions of the camera tube and the light source and the tire;

e. a mark reading section for reading the classification mark by analyzing the electrical signals produced by the camera tube; and f. an identification section for discriminating the kind of the tire by identifying the electrical signals read by the mark reading section.

2. An automatic tire classifying apparatus as claimed in claim 1 in which said rotary mechanism is a turntable which is turned and moved upward to support said tire thereon and moved downward upon completion of the classification of the tire, and said position adjusting mechanism comprises a drive control device for turning and vertically moving said turntable, a tire positioning device which operates to position the tire in place with arms and to active the drive control device to move the turntable upward upon positioning of the tire, a vertical position controlling device provided with a beam emitting light source and a photoelectric element for receiving a beam emitted from the light source which element, when the upper surface of the tire laid on the turntable intercepts the beam from the light source, produces an output signal to cause the drive control device to stop the upward movement of the turntable, and a horizontal position controlling device which operates to control the positions of the camera tube and the illumination light source in response to the inside diameter of the tire so that the classification mark on the tire is detected by the camera tube.

3. An automatic tire classifying apparatus as claimed in claim 1 in which said rotary mechanism incorporates said illumination light source and comprises a plurality of reflective mirrors which are selectively used in response to the inside diameter of said tire for reflecting a light beam which has been emitted from the illumination light source and reflected by the surface of the tire, said light beam being transmitted through optical means toward said camera tube.

4. An automatic tire classifying apparatus as claimed in claim 3 in which said optical means comprises a right-angled prism provided on the center of rotation of said rotary mechanism to transmit said light beam reflected by said reflective mirror in the direction of the axis of rotation of the rotary mechanism and a trapezoid prism which is provided between the right-angle prism and said camera tube, and which is rotated about the axis of rotation of the rotary mechanism at an anglar velocity which is half the angular velocity of the rotary mechanism.

* * * * *